US008071232B2

(12) United States Patent
Ishikawa et al.

(10) Patent No.: US 8,071,232 B2
(45) Date of Patent: Dec. 6, 2011

(54) HYBRID FUEL CELL SYSTEM AND VOLTAGE CONVERSION CONTROL METHOD THEREOF

(75) Inventors: Tetsuhiro Ishikawa, Nishikamo-gun (JP); Tsuyoshi Yano, Nishikamo-gun (JP); Hiroshi Yoshida, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1042 days.

(21) Appl. No.: 10/588,227

(22) PCT Filed: Feb. 2, 2005

(86) PCT No.: PCT/JP2005/001875
§ 371 (c)(1),
(2), (4) Date: Aug. 3, 2006

(87) PCT Pub. No.: WO2005/076433
PCT Pub. Date: Aug. 18, 2005

(65) Prior Publication Data
US 2008/0220298 A1    Sep. 11, 2008

(30) Foreign Application Priority Data
Feb. 3, 2004 (JP) .................. 2004-026743

(51) Int. Cl.
*H02M 3/00* (2006.01)
*H02M 3/02* (2006.01)
*H01M 12/00* (2006.01)
*H01M 12/02* (2006.01)
*H01M 12/08* (2006.01)

(52) U.S. Cl. ............... 429/61; 363/15; 363/17; 363/19
(58) Field of Classification Search .................. None
See application file for complete search history.

(56) References Cited

U.S. PATENT DOCUMENTS

| 7,130,205 B2 * | 10/2006 | Peng ........................... 363/140 |
| 2002/0038732 A1 * | 4/2002 | Sugiura et al. ............... 180/65.2 |
| 2004/0041473 A1 | 3/2004 | Deguchi |

FOREIGN PATENT DOCUMENTS

| JP | A-2000-134939 | 5/2000 |
| JP | A 2002-118979 | 4/2002 |
| JP | A-2002-272136 | 9/2002 |
| JP | A-2003-88140 | 3/2003 |
| JP | A 2003-111384 | 4/2003 |
| JP | 2003235252 A * | 8/2003 |
| JP | A 2003-235252 | 8/2003 |

* cited by examiner

*Primary Examiner* — Melvin Mayes
*Assistant Examiner* — Colin W Slifka
(74) *Attorney, Agent, or Firm* — Oliff & Berridge, PLC

(57) ABSTRACT

To provide a hybrid fuel cell system for improving converter efficiency. In a hybrid fuel cell system (1) in which a fuel cell (22) and an electricity storage device (21) are connected via a voltage converter (20), the voltage converter (20) has a plurality of phases (P1, P2, P3), and the number of phases of operation can be changed in accordance with the power passing through the voltage converter (20). As the number of phases can be changed in accordance with the power passing through the voltage converter (20), it is possible to select the number of phases that give a higher efficiency voltage conversion in accordance with the passing power, and the efficiency of the voltage converter (20) can be greatly improved.

5 Claims, 4 Drawing Sheets

HYBRID FUEL CELL SYSTEM AND VOLTAGE CONVERSION CONTROL METHOD THEREOF

TECHNICAL FIELD

The present invention relates to a hybrid fuel cell system, and more particularly to a fuel cell system capable of increasing the efficiency of a high voltage converter.

BACKGROUND ART

In fuel cell systems installed in electric cars and the like, to respond to load fluctuations that cannot be followed due to the responsiveness of the fuel cell system, a hybrid system connected to the output terminal of the fuel cell that raises or lowers the voltage of the battery output is sometimes used.

In this type of hybrid fuel cell system, technology that takes into consideration the operating efficiency has been disclosed in for example Japanese Patent Application Laid-open No. 2002-118979, in which the ratio of the maximum output of battery and fuel cell is set to the range where the fuel cell is 65~80% of the total output, and losses in a DC-DC converter are suppressed.

DISCLOSURE OF INVENTION

However, the above technology did not take into consideration that efficiency can be improved depending upon the method of using the converter itself. Therefore, the converter is not always used under conditions of good efficiency, and the overall optimum efficiency was not sought.

Therefore it is an object of the present invention to provide a hybrid fuel cell system that achieves efficiency improvements in the converter.

In order to solve this problem in a hybrid fuel cell system in which the fuel cell and an electricity storage device are connected via a voltage converter comprising a plurality of phases, the present invention includes a controller that changes the number of phases used by the voltage converter in accordance with the value equivalent to power passing through the voltage converter.

Also, in a hybrid fuel cell system in which the fuel cell and an electricity storage device are connected via a voltage converter, the present invention is characterized in that the voltage converter includes a plurality of phases, and the number of phases of operation can be changed in accordance with the value equivalent to an input/output conversion energy volume or operation volume of the voltage converter.

Also, the present invention includes a method of controlling voltage conversion of a hybrid fuel cell system in which the fuel cell and an electricity storage device are connected via a voltage converter comprising a plurality of phases, wherein when the voltage converter includes a plurality of phases, the value equivalent to power passing the voltage converter is measured, and the number of phases used is changed in accordance with the measured equivalent value.

The conversion efficiency of a voltage converter having a plurality of phases varies in accordance with the input/output conversion energy or the operating power of the voltage converter. Generally, in a voltage converter having a plurality of phases, energy lost during conversion, in other words the losses, vary in accordance with the value equivalent to the power passing through the voltage converter, for example, the input/output conversion energy or the operating power. Here, the number of phases with better efficiency can vary between the efficiency in the case of operation with a plurality of phases and the efficiency in the case of operation with fewer phases. This is because the efficiency is determined by the overall effect of reactor copper losses lost in the reactor component, element losses occurring due to operation of the IGBT and other switching elements, reactor iron losses lost in the reactor component, and so on. According to the configuration described above, it is possible to change the number of phases in accordance with the value equivalent to the power passing through the voltage converter, for example the value equivalent to an input/output conversion energy volume or operation volume, therefore voltage conversion can be carried out by selecting the number of phases with the higher efficiency, so that it is possible to greatly increase the efficiency of the voltage converter.

Here, in the present invention the "electricity storage device" is not limited, and may be for example a nickel-hydrogen cell or lead accumulator, either singly or a plurality of cells laminated.

Also, the "voltage converter" is a converter (DC-DC converter) having a plurality of phases and direct current voltage conversion capability.

Furthermore, "value equivalent to a voltage converter input/output conversion energy volume or operation volume" corresponds to the energy associated with voltage conversion or the operating power of the voltage converter, and specifically is equivalent to the value of electrical power, the value of current, or some other parameter. The criterion for selecting the number of phases that gives the voltage converter a good efficiency is not particularly limited.

For example, if the voltage converter is a three phase bridge type converter, the number of phases of operation is controlled in accordance with the value equivalent to an input/output conversion energy volume or operation volume of the voltage converter. A converter with a three phase bridge type circuit configuration is applicable.

In other words, in the above configuration, when the equivalent value is less than a predetermined value, it is desirable to operate with fewer phases than when the equivalent value is equal to or greater than the predetermined value. Specifically, as the input/output conversion energy or operating power increases from zero, the reactor copper losses and element losses increase on the one hand, but the reactor iron losses are virtually constant regardless of the magnitude of the input/output conversion energy or operating power, and the reactor iron losses are greater for a plurality of phases than for a single phase. By combining these losses it is determined that the overall efficiency is higher for a plurality of phases than single phase when the value equivalent to an input/output conversion energy volume or operation volume is greater than a certain value, but in the regime where the equivalent value is smaller than this value the efficiency of single phase operation is higher, or the phenomenon is reversed. According to this configuration, when the equivalent value of input/output conversion energy or operating power is in the relatively high region the operation is multi-phase, but in the region where there is a reversal in the overall losses, operation is carried out with fewer phases than multi-phase, so operation is always carried out under the best efficiency.

Here the "predetermined value" is set to correspond to the value at which the overall efficiency of the voltage converter reverses, but this value is not necessarily essential, and the value can be set and changed as appropriate taking into consideration operational stability and other circumstances.

Also, in the present invention, operation switches between multi-phase operation with a plurality of phases and single phase operation with a single phase, and it is desirable that during multi-phase operation when the equivalent value is smaller than a first value, operation switches to the single phase, and during single phase operation when the equivalent value exceeds a second value greater than the first value, operation switches to multi-phase operation.

According to this configuration, the sequence of switching the number of phases of operation forms a hysteresis loop, so it is possible to eliminate the unstable hunting state in which after switching the number of phases it returns to the original number of phases.

Here the "first value" and the "second value" are set to correspond to the values at which the overall efficiency of the voltage converter reverses between multi-phase operation and single phase operation, but these values are not necessarily essential, and the values can be set and changed as appropriate taking into consideration operational stability and other circumstances.

BEST MODE FOR CARRYING OUT THE INVENTION

The preferable embodiments for accomplishing the embodiments of the present invention will be explained in the following with reference to the accompanying drawings.

The embodiment of the present invention is the present invention applied to a fuel cell system installed in an electric vehicle.

Figure 1:
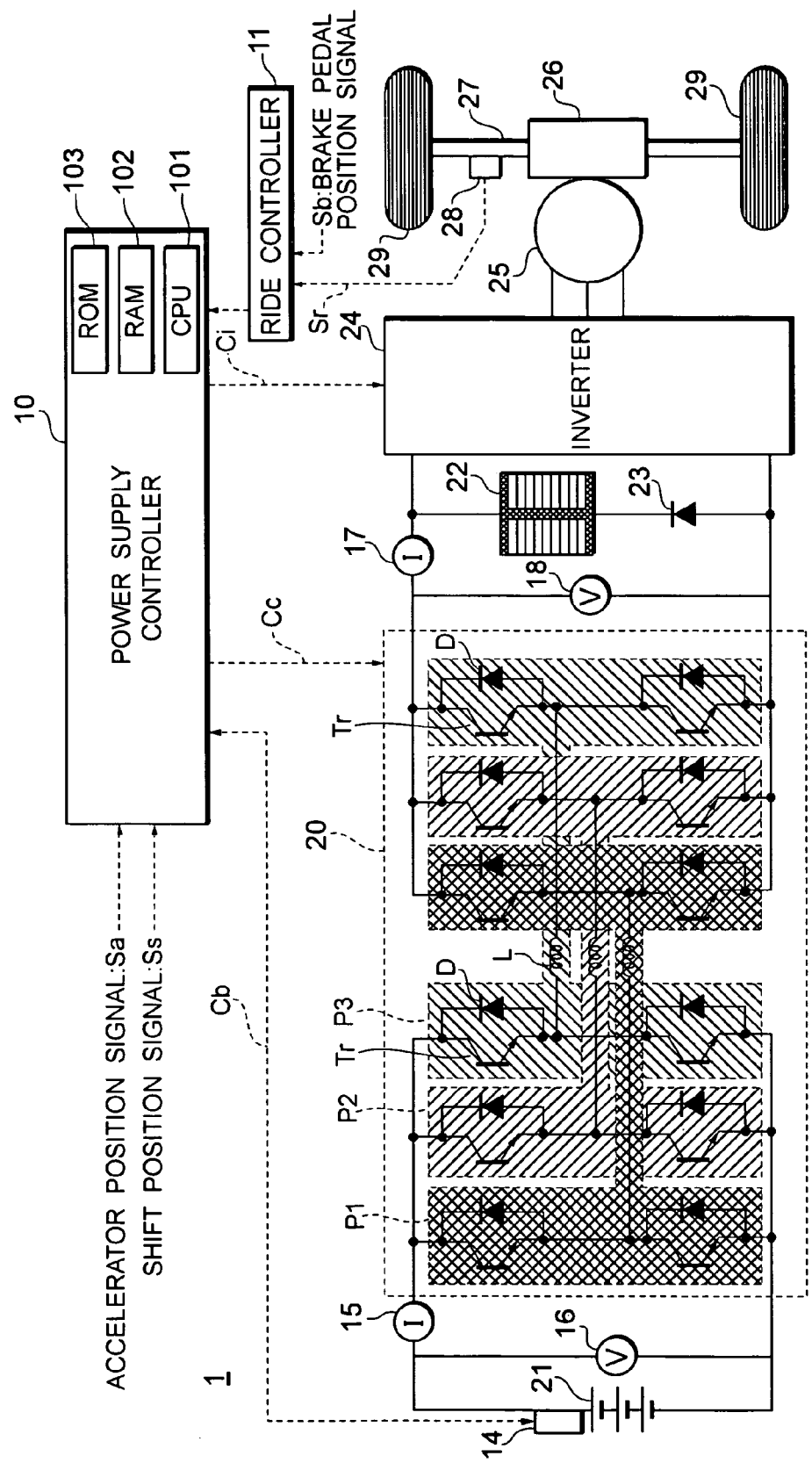
FIG. 1 is a block diagram of the hybrid fuel cell system according to the present embodiment.

FIG. 1 shows a diagram of the overall system of the present hybrid fuel cell system 1. The hybrid fuel cell system 1 includes a DC-DC converter 20, a secondary battery 21, a fuel cell 22, a reverse flow prevention diode 23, an inverter 24, a three phase motor 25, a deceleration device 26, a shaft 27, a vehicle wheel 29, a power supply controller 10, and a ride controller 11.

The secondary battery 21 is an electricity storage device in the present invention, that outputs a predetermined voltage by laminating a plurality of battery units such as freely chargeable nickel-hydrogen cells and connecting them in series. On the output terminal of the secondary battery 21, a battery computer 14 capable of communicating with the power supply controller 10 by a control signal Cb is provided, which maintains the charging state of the secondary battery 21 at a suitable value so that the secondary battery is neither overcharged nor over-discharged, and operates to maintain safety in the event that a fault occurs to the secondary battery 21. The output of the secondary battery 21 can be measured by a current sensor 15 and a voltage sensor 16.

The DC-DC converter 20 is a voltage converter that converts and outputs the electric power input on the primary side into a voltage value different from the primary side. In this embodiment, by raising the direct current output voltage of the secondary battery 21 (for example about 200V) to a higher direct current voltage (for example about 500V), it is possible to drive the three phase motor 25 with a low current and high voltage, to minimize the electrical losses due to the power supply, and to raise the output of the three phase motor 25. The DC-DC converter 20 uses the three phase operating principle, and the specific circuit configuration is the three phase bridge type converter circuit configuration. The three phase bridge type converter combines a part with a circuit similar to that of an inverter that converts an input direct current voltage into an alternating current voltage and a part that again rectifies the alternating current and converts it into a different direct current voltage. As shown in FIG. 1, between the primary input terminals and between the secondary output terminals of the converter are a switching terminal Tr and a rectifier D respectively in a parallel connection structure, duplicated in two stages, and configured in a three phase parallel (P1, P2, P3) connection. The intermediate points of the two stage structure of the primary side and the secondary side respectively are connected by a reactor L. An Insulated Gate Bipolar Transistor (IGBT) may be used as the switching terminal Tr, and a diode may be used as the rectifier D. The DC-DC converter 20 is switched with adjusted timing so that the phase difference between phases is 120 degrees ($2\pi/3$). Each phase can be independently operated based upon a control signal Cc from the power supply controller 10. The output of the DC-DC converter 20 can be measured by a current sensor 17 and a voltage sensor 18. Also, the input current value, the output current value, the input voltage value, and the output voltage value of the DC-DC converter 20 can be output to the power supply controller 10 by the current sensor 15, the current sensor 17, the voltage sensor 16, and the voltage sensor 18 respectively.

During operation under light load or during braking, the operation of the DC-DC converter 20 is regeneration, the three phase motor 25 is reversed to generate electricity as a generator, the direct current voltage of the converter is stepped down from the secondary side to the primary side, and the secondary battery 21 is charged.

The fuel cell stack 22 is a stack of a plurality of single cells, connected in series. The structure of a single cell includes a polymer electrolyte film or similar sandwiched between two electrodes, a fuel electrode and an air electrode, which is sandwiched between separators to supply fuel gas (hydrogen) and air or oxygen (oxygen). The fuel electrode includes a catalyst layer as fuel electrode provided on a porous support layer, and the air electrode includes a catalyst layer as oxygen electrode provided on a porous support layer.

The fuel cell stack 22 includes a fuel gas supply system, an air supply system, and a cooling water supply system, which are commonly known and not shown on the drawings, and by controlling the supply rate of fuel gas and the supply rate of air using these systems, it is possible to generate an arbitrary amount of electrical power.

The inverter 24 converts the high voltage direct current whose voltage was raised by the DC-DC converter 20 into three phase alternating current whose phases are at 120 degrees to each other. The current of the inverter 24 is controlled by a control signal Ci from the power supply controller 10, as for the converter 20.

The three phase motor 25 is the main motive force for the electric vehicle, and during deceleration the three phase motor 25 generates regenerative power. The deceleration device 26 is known as the differential, and it reduces the high speed revolutions of the three phase motor 25 to a predetermined rate of rotation, to cause the vehicle wheel 29 to rotate. A vehicle wheel velocity sensor 28 is provided on the shaft 27, and a vehicle wheel velocity pulse Sr is output to the ride controller 19.

The ride controller 11 is a computer system for controlling the ride state, that outputs the regeneration value required from the three phase motor 25 to the power supply controller 10, based upon a brake position signal Sb from the brake pedal and the vehicle wheel velocity pulse Sr. The required regeneration value may in addition be output based upon the measurement signals from a steering angle sensor, a yaw rate and G sensor, a master cylinder pressure sensor, and a wheel cylinder pressure sensor.

The power supply controller 10 is a computer system for power supply control, and includes for example a central processing unit (CPU) 101, a RAM 102, a ROM 103, and the like. An accelerator position signal Sa, a shift position signal Ss, and signals from many types of sensor are input to the power supply controller 10, and the power supply controller 10 is programmed to derive the amount of generation from the fuel cell stack 22 and the torque of the three phase motor 25, and carry out overall control of the electrical power supply including the balance of power between the fuel cell stack 22, the three phase motor 25, and the secondary battery 21, adding in the losses in the converter 20 and the inverter 24.

Next, the operation of the hybrid fuel cell system 1 according to the present embodiment is explained. First, the losses that occur in the DC-DC converter 20 are explained.

Figure 4:
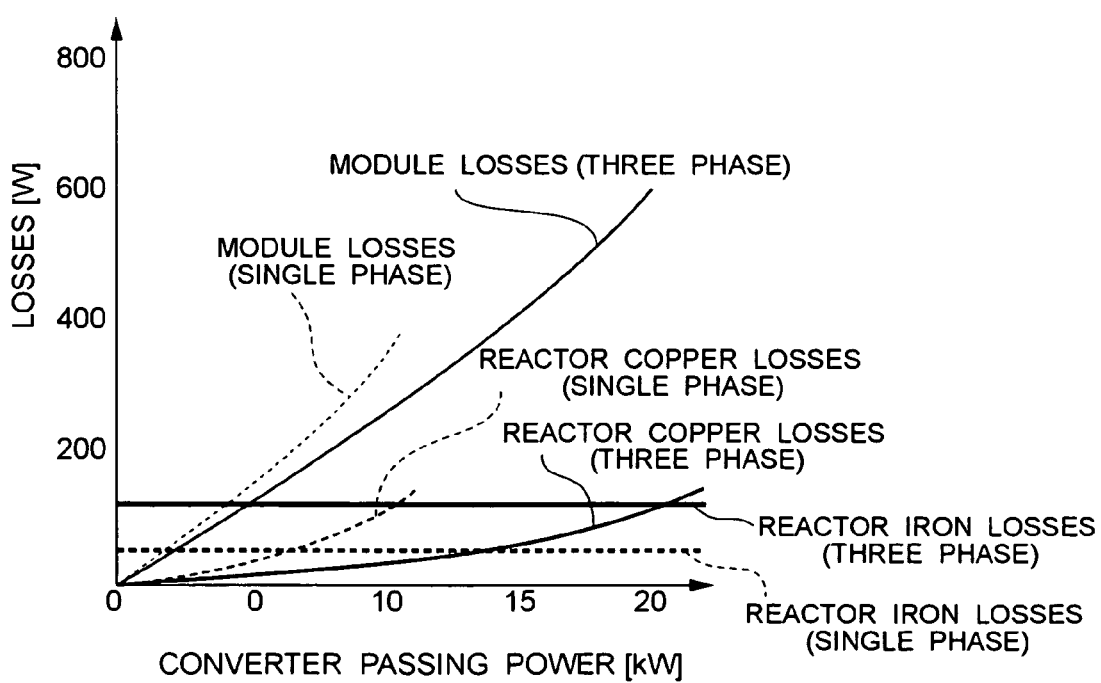
FIG. 4 is a diagram showing the various types of loss characteristics of a three phase bridge type converter.

Generally, in a voltage converter having a plurality of phases the electrical power lost, in other words the losses, in the converter fluctuates depending upon the power (equivalent value of input/output conversion energy, operating power) passing through the voltage converter. Here, the number of phases with better efficiency can vary between the efficiency in the case of operation with a plurality of phases and the efficiency in the case of operation with fewer phases. For example, FIG. 4 shows the loss characteristics for a three phase bridge type converter such as the DC-DC converter 20. As shown in FIG. 4, the losses in a three phase bridge type converter include the reactor copper losses lost in the reactor component, module losses that occur in association with the switching terminal of the IGBT and similar, and reactor iron losses lost in the reactor component. Reactor copper losses are caused by coils, and increase as the passing power increases, and are larger for single phase operation than for three phase operation. Module losses increase as the passing power increases, and are larger for single phase operation than for three phase operation. In contrast the reactor iron losses due to magnetic parts in the reactor L have virtually no variation as the passing power increases or decreases, and the losses are greater for three phase operation than for single phase operation.

Figure 5:
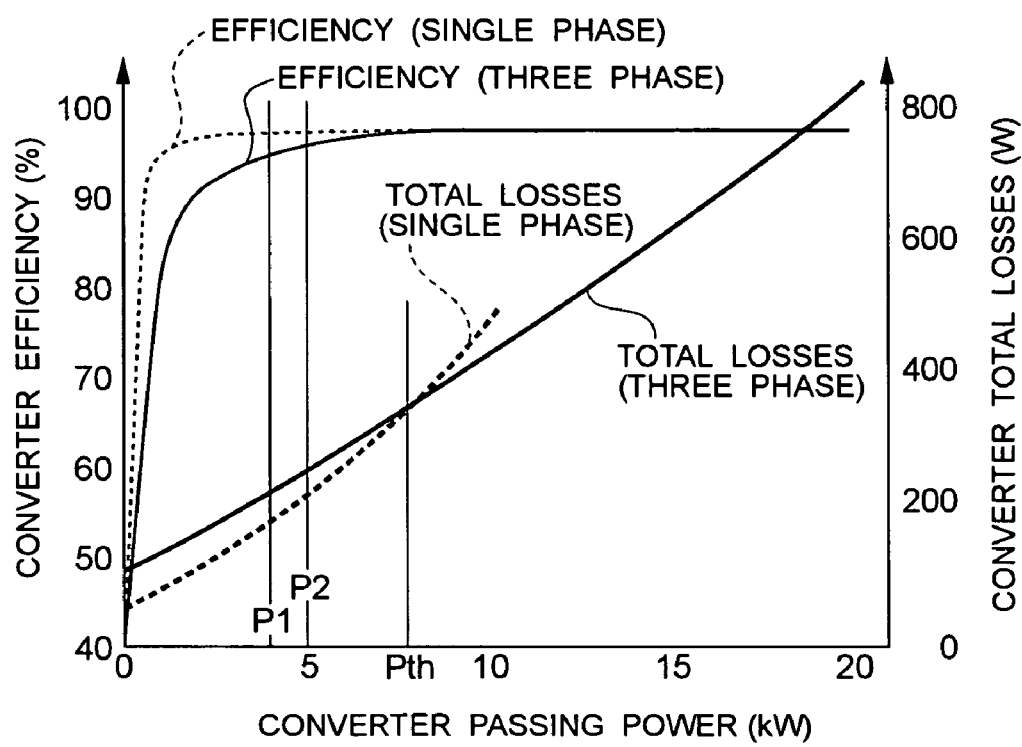
FIG. 5 is a diagram explaining the total efficiency in a three phase bridge type converter.

FIG. 5 shows the relationship between the converter total loss obtained by adding these losses and the converter conversion efficiency. As stated above, the relationship between the size of the losses for single and three phase are reversed for reactor copper losses and module losses on the one hand and reactor iron losses on the other hand, and there are differences in change ratios. Therefore, in the area where the passing power is comparatively high, the losses are smaller for three phase operation, which has more phases, than for single phase operation, but in the area below a specific passing power Pth the reverse phenomenon occurs, the losses are smaller for single phase than for three phase. Looking at the total conversion efficiency of the converter, for relatively small passing power the efficiency of single phase operation is higher than the efficiency of three phase operation. Therefore in the present invention in the area where the passing power is relatively small, single phase operation, which has fewer phases, is used, and when the passing power is high operation switches to three phase operation, which has more phases.

Here, it is possible to switch the number of phases in accordance with whether the passing power is greater or less than Pth, at which the relationship between the magnitude of the total losses reverses for each phase, but obtaining the passing power by actual measurements is troublesome. Also, the greater the passing power the greater the problems caused by switching that tend to occur, such as hunting. For these reasons in the present embodiment switching between single phase and three phase is controlled to occur at a passing power that is small to a certain extent. For example, as shown in FIG. 5, a first power value P1 and a second power value P2 are the threshold values for switching the number of phases.

Figure 3:
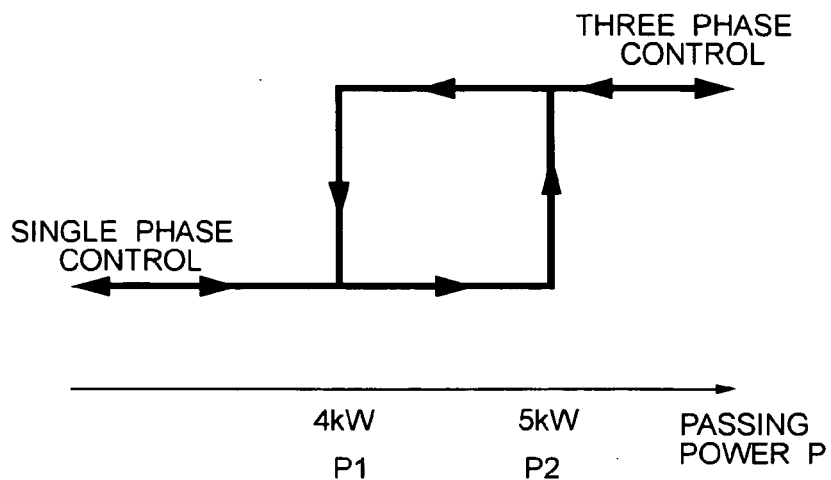
FIG. 3 is a diagram showing operation hysteresis in the present hybrid fuel cell system.

In other words, as shown in FIG. 3, in the present embodiment, when the DC-DC converter 20 is in three phase operation, if the passing power becomes smaller than the first power value P1 (for example, 4 kW), the DC-DC converter 20 is controlled to switch to single phase operation. Also, when in single phase operation, if the passing power increases beyond the second power value P2 (for example 5 kW), which is larger than the first power value P1, the DC-DC converter is controlled to switch to three phase operation. Having two threshold values in this way is to prevent hunting (an unstable phenomenon like a vibration) which can occur when switching. In other words, as shown in FIG. 3, this kind of operation sequence forms a hysteresis loop. Therefore when the number of phases of operation is changed the state is stable, and an unstable hunting state, in which after switching the number of phases the state returns to the original state and again switches, can be eliminated.

Figure 2:
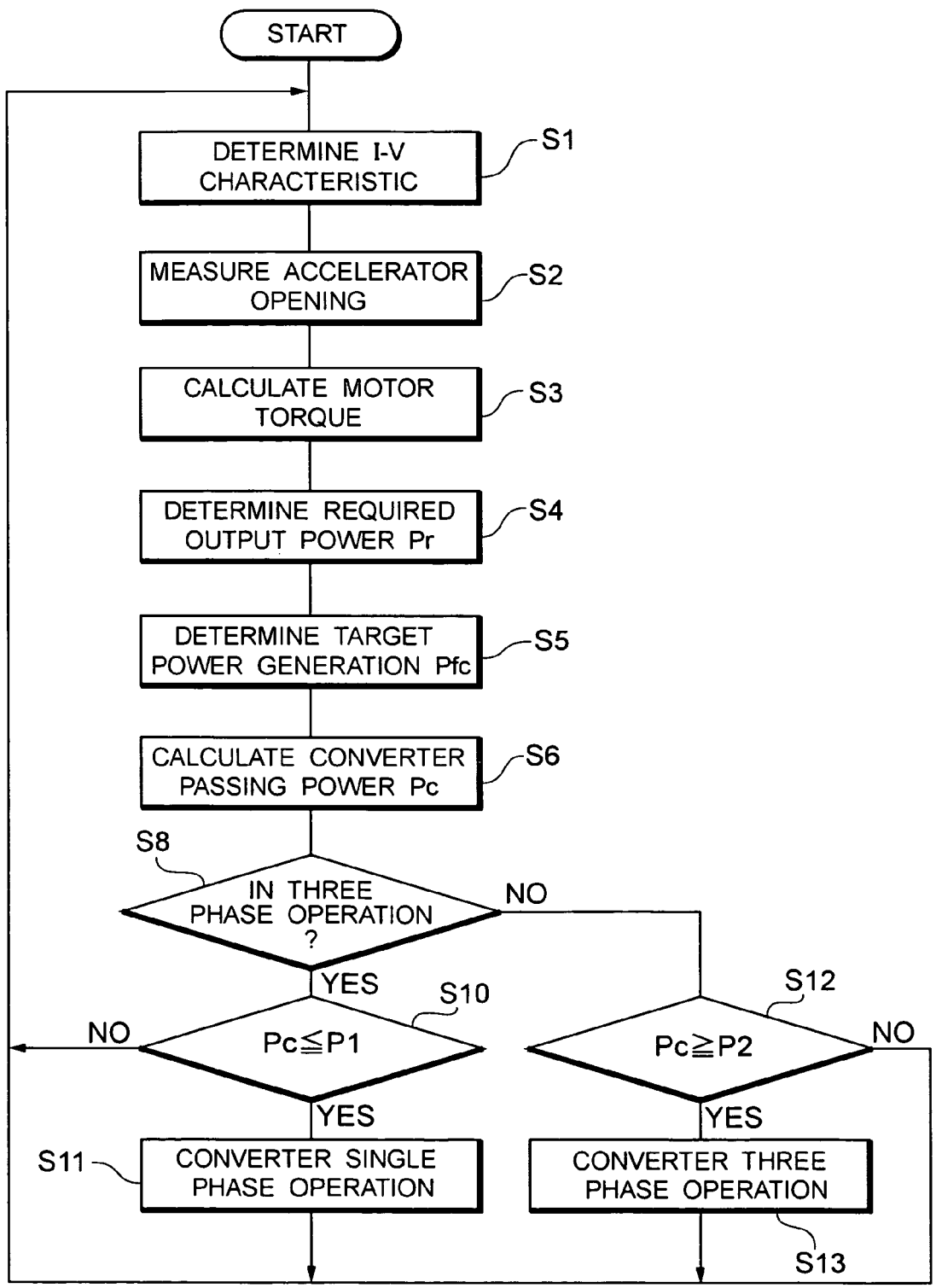
FIG. 2 is a flowchart explaining the method of controlling the hybrid fuel cell system according to the present embodiment.

Next, the power supply control operation of the present hybrid fuel cell system 1 is explained with reference to the flowchart in FIG. 2.

First, the power supply controller 10 refers to the measurement signals from a hydrogen sensor (provided for example in the gas flow path on the anode side of the fuel cell stack) and a temperature sensor (provided for example in the fuel cell stack cooling water outlet), which are not shown of the drawings, and determines the output current—output voltage (I-V) characteristic of the fuel cell stack 22 (S1). If the supply pressure of the hydrogen fuel gas is fixed, the relationship between the output current and the output voltage of the fuel cell is essentially determined. Also, this relationship is affected by the fuel cell temperature. A table of data that determines this relationship between the temperature and the I-V characteristic for each hydrogen supply pressure is stored in the ROM 103, and the power supply controller 10 can determine the output current—output voltage characteristic corresponding to the measured temperature by referring to this table. If there is no data table corresponding to the measured temperature, an approximated output current-output voltage can be calculated by referring to the data tables for temperatures above and below the measured temperature, and forming a weighted average of the characteristic values on the data tables for the measured temperature.

Next, to obtain the load on the hybrid fuel cell system 1, the power supply controller 10 refers to the accelerator position signal Sa (acceleration required value), and the shift position signal Ss (forward, reverse, gearing ratio required value) (S2), and calculates the torque (load) required from the three phase motor 25 (S3). This torque determines the effective three phase alternating current electrical power to be output from the inverter 24. Also, power losses occurring in the inverter 24 and the converter 20 are included, and the power supply controller 10 determines the required power Pr required from the total system (S4).

If the load is small, the target power generation Pfc of the fuel cell stack 22 to supply the required output power Pr is obtained from the output current-output voltage characteristic (S5), and the secondary side voltage of the converter 20 is controlled by the control signal Cc so that the output terminal voltage is such that the power generation Pfc can be output. If all the required output power Pr cannot be supplied by the fuel cell stack 22 by changing the secondary side voltage alone, the power supply controller 10 controls changing the supply of fuel gas or air to change the I-V characteristic to supply the deficiency in power.

However, during start-up or when accelerating or during other times when the load suddenly increases, there are occasions when the suddenly changed load temporarily cannot be supplied by increasing the supply of fuel gas or air supply, due to the responsiveness of the fuel cell or a limit on output. In these situations power is supplied from the secondary battery 21 to the secondary side via the converter 20. In these situations the control according to the present invention is necessary.

The power supply controller 10 calculates the electrical power that must be supplied from the secondary battery 21 to the inverter 24 by carrying out a power balance calculation, in other words, calculates the converter passing power Pc (S6). When the load is small, the result of the power balance calculation is that the power balance is in equilibrium, in other words, the converter passing power Pc is virtually zero.

On the other hand, if the result of the power balance calculation is that part of the power must be supplied from the secondary battery 21, the converter passing power Pc is the value corresponding to the deficit in the power balance.

The power supply controller 10 changes the threshold value for changing the number of phases, depending upon whether the DC-DC converter 20 is in three phase operation or not (S8). In other words, if the operation is currently three phase (S8: YES), then as can be seen from FIG. 5, the efficiency is good if the passing power is comparatively high, and the efficiency reduces as the passing power becomes low. Therefore, the power supply controller 10 compares the first power value P1 with the passing power Pc (S10), and if the passing power Pc is greater than the first power value P1 (NO), three phase operation continues, but if the passing power Pc has become equal to or smaller than the first power value P1 (YES), a control signal Cc is output to switch to single phase operation which is efficient when the passing power is relatively small (S11).

On the other hand, if the operation is currently single phase (S8: NO), the efficiency is good if the passing power is comparatively low but the efficiency drops when the passing power becomes large. Therefore, the power supply controller 10 compares the second power value P2 and the passing power Pc (S12), if the passing power Pc is smaller than the second power value P2 (NO), single phase operation continues unchanged, but if the passing power Pc has become equal to or greater than the second power value P2 (YES), a control signal Cc is output to switch to three phase operation for which the efficiency is good when the passing power is relatively high (S13).

In the operation described above, the power balance was estimated and the converter passing power was derived, but the passing power of the converter 20 may be calculated by measuring the primary side power of the converter 20 from the current sensor 15 and the voltage sensor 16, and the secondary side power from the current sensor 17 and the voltage sensor 18, and obtaining the passing power from the difference of the two.

According to the process of the present embodiment as described above, the number of phases is selected so that the efficiency is good at the value of power of the passing power Pc of the DC-DC converter 20, and operation is carried out in that number of phases, so a hybrid fuel cell system 1 can be provided with good efficiency taking the converter operation into account.

Other Embodiments

Besides the above embodiments, many types of modifications may be applied to the present invention.

For example, in the above embodiments switching was between single phase and three phase, but it is possible to control switching between other combinations, for example, switching between three phase operation and two-phase operation, or switching between two-phase operation and single phase operation.

In the above embodiments, a three phase bridge type converter was used as an example, but the circuit configuration is not limited to this. Provided there is multi-phase operation (two phases or more) and the converter is capable of independently switching phases, the present invention can be applied and it is possible to operate so as to obtain the effect of the present invention.

Also, in the above embodiments, the converter switched between single phase operation and three phase operation, but it is also possible to switch continuously from single phase to multiple phases in several steps, or switch continuously from multiple phases to single phase in several steps, in accordance with the passing power.

Also, in the above embodiments, the product of the current and terminal voltage was used as the power value in the narrow sense as the converter passing power, but it is possible to change the number of phases based upon the equivalent value of input/output conversion energy or operating power, or the current value or voltage value under constant conditions, and so on.

INDUSTRIAL APPLICABILITY

According to the present invention, it is possible to change the number of phases of operation in accordance with the value equivalent power passing through the voltage converter, so it is possible to improve the overall efficiency by appropriately selecting the number of phases to obtain good efficiency of the voltage converter. Therefore, the present invention can be applied to systems in which the power passing through a voltage converter frequently changes, for example, vehicles, shipping, aircraft, and other moving equipment, robots, mobile electronic terminals, and other electronic equipment in which fuel cell systems are mounted.

We claim:

1. A method of controlling voltage conversion of a hybrid fuel cell system in which a fuel cell and an electricity storage device are connected via a voltage converter provided with a plurality of phases, the method comprising:
    measuring a value equivalent to power passing through the voltage converter;
    changing a number of phases of operation of the voltage converter in accordance with the measured equivalent value such that changing the number of phases of operation switches the converter between a single phase drive mode and a multiple phase drive mode; and for each of the phases in the voltage converter, handling an alternating current and having a different phase shift with respect to the other phases, wherein when the changing of the number of phases used by the voltage converter occurs, the changing of the number of phases is conducted in a synchronized manner, the operation is switched to the single phase drive mode during the multiple phase drive mode when the equivalent value becomes smaller than a first value, and the operation is switched to the multiple phase drive mode during the single phase drive mode when the equivalent value is larger than a second value that is larger than the first value, and the first and second values are both set less than a threshold value at which a total loss of the voltage converter for the single phase drive mode surpasses a total loss of the voltage converter for the multiple phase drive mode.

2. The method of controlling voltage conversion of a hybrid fuel cell system according to claim 1, wherein when the equivalent value is smaller than a predetermined value, the number of phases of operation for use is fewer than the number of phases of operation when the equivalent value is equal to or greater than the predetermined value.

3. A hybrid fuel cell system comprising:
a fuel cell;
an electricity storage device;
a three phase bridge type voltage converter connecting the fuel cell with the electricity device and comprising a plurality of phases; and
a controller configured to change a number of phases of operation of the voltage converter in accordance with a value equivalent to power passing through the voltage converter,
wherein by changing the number of phases of operation, the controller switches the voltage converter between a single phase drive mode and a multiple phase drive mode,
wherein each of the phases in the voltage converter handles an alternating current and has a different phase shift with respect to the other phases,
wherein the controller is configured to change the number of phases in a synchronized manner when the number of phases used by the voltage converter is changed,
wherein the controller is configured to switch the operation to the single phase drive mode during the multiple phase drive mode when the equivalent value becomes smaller than a first value,
wherein the controller is configured to switch the operation to the multiple phase drive mode during the single phase drive mode when the equivalent value is larger than a second value that is larger than the first value, and
wherein the first and second values are both set less than a threshold value at which a total loss of the voltage converter for the single phase drive mode surpasses a total loss of the voltage converter for the multiple phase drive mode.

4. A hybrid fuel cell system according to claim 3,
wherein when the equivalent value is smaller than a predetermined value, the number of phases of operation is fewer than the number of phases of operation when the equivalent value is equal to or greater than the predetermined value.

5. The hybrid fuel cell system according to claim 3, wherein
the electricity storage device is connected to a primary side of the voltage converter,
the fuel cell is connected to a secondary side of the voltage converter, and
the fuel cell is connected to load equipment so as to provide the electrical power of the fuel cell.

* * * * *